United States Patent [19]

Luke

[11] 4,160,600
[45] Jul. 10, 1979

[54] PRESSURE-RESPONSIVE APPARATUS

[75] Inventor: Douglas V. Luke, Farnham Common, England

[73] Assignee: Smiths Industries Limited, London, England

[21] Appl. No.: 832,706

[22] Filed: Sep. 12, 1977

[30] Foreign Application Priority Data

Sep. 23, 1976 [GB] United Kingdom ............... 39575/76
Jun. 22, 1977 [GB] United Kingdom ............... 26122/77

[51] Int. Cl.² ............................................. G01B 9/02
[52] U.S. Cl. ...................................... 356/352; 73/705; 73/716
[58] Field of Search ................... 356/106 R, 112, 352; 73/705, 715, 716, 717, 718, 729

[56] References Cited
U.S. PATENT DOCUMENTS

| | | | |
|---|---|---|---|
| 3,277,720 | 10/1966 | Roth | 73/718 |
| 3,387,494 | 6/1968 | Golay | 73/715 X |
| 3,537,798 | 11/1970 | Taft et al. | 356/112 |
| 3,580,082 | 5/1971 | Strack | 73/715 X |
| 4,084,438 | 4/1978 | Lee et al. | 73/716 X |

Primary Examiner—John K. Corbin
Assistant Examiner—Matthew W. Koren
Attorney, Agent, or Firm—Pollock, Vande Sande & Priddy

[57] ABSTRACT

A pressure transducer has a capsule having two chambers separated from one another by a diaphragm. The capsule is made entirely of a glass-ceramics material, such as, lithium alumino silicate. One of the chambers is sealed and has a lens with a curved surface adjacent the diaphragm such that, when the capsule is illuminated, a Newton's Rings pattern is produced by interference between light reflected from the surface of the lens and the diaphragm. Pressure is communicated to the other chamber so as to cause the diaphragm to be deflected into or out of the sealed chamber with a consequent shift in the interference pattern which is used to provide a measure of the pressure change. The capsule also has two further chambers which are identical to the first two chambers and which are both sealed. One of these further chambers is illuminated to produce a second interference pattern. The difference between any shift in the two patterns gives an indication of the pressure change that is independent of temperature change. The two interference patterns may be produced by light from the same source supplied to the capsule via fibre-optic cables, the light being reflected onto the capsule by a prism assembly mounted directly on the capsule. Similarly the interference patterns may be focussed by the prism assembly onto an array of the ends of fibre-optic cables used to supply light from the patterns to photocells.

12 Claims, 5 Drawing Figures

PRESSURE-RESPONSIVE APPARATUS

BACKGROUND OF THE INVENTION

This invention relates to pressure-responsive apparatus.

Pressure-responsive apparatus commonly relies on the detection of displacement of an elastic or resilient member subjected to pressure, such as, for example, a diaphragm of a pressure capsule. Difficulties have been experienced in the past in making accurate measurements of pressure in regions subject to large temperature changes, such as, for example, in gas-turbine engines (where the temperature may range from the order of four hundred degrees Centigrade to minus fifty degrees Centigrade), since the Young's modulus of elasticity of the elastic member (which determines the amount of deformation of the member produced upon application of pressure to it) may greatly vary in accordance with temperature. Further difficulties are experienced in gas-turbine engines since the transducer used in the apparatus for sensing pressure within the engine must remain unaffected by high vibration levels and a large number of contaminants, such as, for example, fuel, hydraulic fluids and lubricants, that may be present. In gas-turbine engines used in aircraft the pressure-responsive apparatus must moreover be of a compact size and low weight.

BRIEF SUMMARY OF THE INVENTION

It is an object of the present invention to provide pressure-responsive apparatus that may be used to alleviate the above-mentioned difficulties.

According to one aspect of the present invention there is provided pressure-responsive apparatus including a member arranged to be subjected to pressure and means for sensing displacement of said member so as thereby to derive an output in accordance with change in pressure, wherein the said member is of a glass-ceramics material having a substantially constant modulus of elasticity over a wide temperature range.

The output from apparatus having a member made of such a material is virtually independent of temperature.

The glass-ceramic used may be lithium alumino silicate.

According to another aspect of the present invention there is provided pressure-responsive apparatus including a capsule having a diaphragm with a reflective surface and a lens with a curved reflective surface, said lens being disposed adjacent the said diaphragm and the diaphragm being adapted to be deflected relative to the lens upon change in pressure, the apparatus also including means for illuminating both said reflective surfaces such as to produce a pattern of fringes caused by interference between light reflected from said reflective surfaces, and means for sensing displacement of said fringes and the direction of such displacement so as thereby to derive an output in accordance with change in pressure applied to said diaphragm.

The diaphragm or even the entire capsule may be of a glass-ceramics material, such as, for example, lithium alumino silicate.

Apparatus in accordance with the present invention can be of a compact size and low weight while functioning satisfactorily under the environmental conditions experienced in and around gas-turbine engines.

Pressure-responsive apparatus in accordance with the present invention, will now be described, by way of example, with reference to the accompanying drawings.

DETAILED DESCRIPTION

Figure 1:
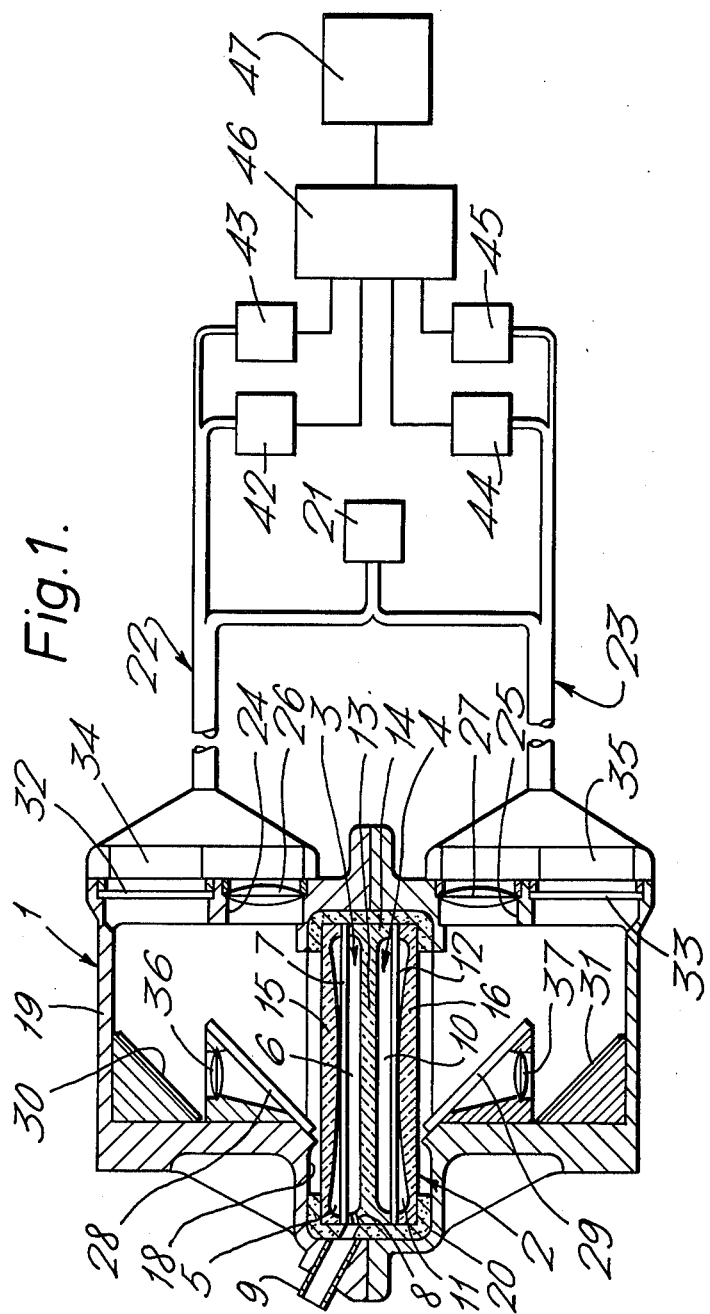
FIG. 1 is a part-sectional view of the pressure-responsive apparatus including a first form of pressure transducer.
Figure 2:
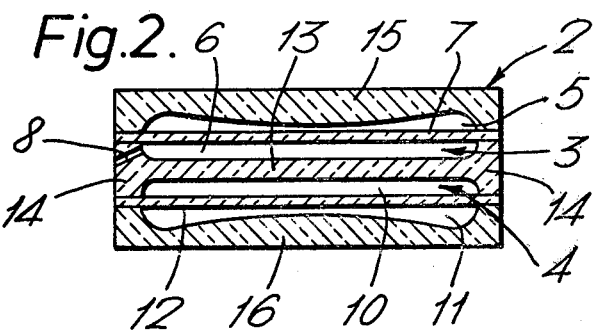
FIG. 2 is an enlarged sectional view of a pressure capsule used in the first form of pressure transducer shown in FIG. 1.

With reference to FIGS. 1 and 2, the pressure-responsive apparatus includes a transducer 1 which has a pressure capsule 2 (that is shown more clearly in FIG. 2) having an upper cell 3 and a lower cell 4. The upper cell 3 is divided into upper and lower chambers 5 and 6 respectively by a flat diaphragm plate 7. The lower chamber 6 communicates through a passageway 8 in the wall of the capsule 2 to a pressure inlet 9, whereas the upper chamber 5 is sealed from the lower chamber 6 and is evacuated to a low pressure. Similarly, the lower cell 4 is divided into upper and lower chambers 10 and 11 respectively by a flat diaphragm 12, the lower chamber 11 being evacuated to a low pressure while the upper chamber 10 is at a different pressure such as, for example, atmospheric pressure at sea level.

The capsule 2 has a rigid circular plate 13 which separates the two cells 3 and 4 and which has a rim 14 around its edge that extends both above and below the center of the plate to form a part of the wall of the capsule. The diaphragm plates 7 and 12 are located above and below the plate 13 respectively with their edges resting on and sealed to the upper and lower surfaces of the rim 14, thereby enclosing the chambers 6 and 10. Two plano-convex lenses 15 and 16, each of which has a circumferential rim about its convex surface, are located above and below respectively the two diaphragms 7 and 12, with their rims sealed about the edges of their respective diaphragms such that the convex surface of each lens faces, and is spaced by a small distance from the respective diaphragm. The capusle 2 is therefore of a symmetrical construction and, apart from the passageway 8 communicating with the chamber 6, is hermetically sealed.

The capsule 2 is made of lithium alumino silicate which is a glass-ceramic material. A reflective coating of aluminum is formed on that side of each diaphragm which faces its respective lens, and a semi-reflective coating of aluminum is formed on the convex surface of each of the lenses. Glass-ceramics are polycrystalline ceramic materials formed from glass material by controlled heat treatment and can have properties that make them especially suitable for use in this application. In particular, some glass-ceramics have a high mechanical strength, a virtually constant Young's modulus of elasticity over a wide temperature range, a very low coefficient of thermal expansion, can be easily machined within small dimensional tolerances and are highly resistant to corrosion from a wide range of chemical substances.

The diaphragms 7 and 12 may be sealed to the rim 14 of the plate 13, and the lenses 15 and 16 may be sealed to the diaphragms 7 and 12 respectively, either by fusing upon application of heat, or by friction welding. In friction welding the contacting surfaces are machined to an optically-flat finish and are rotated relative to one another while in contact, and upon application of pressure, to produce a friction weld between them. Alternatively the components of the capsule may be joined using a glass or glass-ceramic solder, or by laser welding.

The pressure capsule 2 sits within a central recess 18 of the housing 19 of the pressure transducer 1, and is supported around its edge by an anti-vibration mounting 20 formed of stainless-steel mesh. The capsule 2 is illuminated on its upper and lower surfaces by radiation from a monochromic light source 21, mounted remote from the transducer 1. Radiation from the light source 21 is supplied to the pressure transducer 1 via fibre-optic cables 22 and 23 that extend to windows 24 and 25 in the side of the transducer housing 19 positioned respectively above and below the capsule 2. Light emerging from the ends of the cables 22 and 23 passes through identical coverging lenses 26 and 27 respectively which are mounted in the windows 24 and 25 and which are spaced from the ends of the cables by a distance equal to their focal lengths, so as to produce parallel beams of light that are directed parallel to the surface of the capsule 2.

Two semi-reflecting mirrors 28 and 29 are positioned at an angle of 45 degrees to the horizontal above and below respectively the pressure capsule 2 such as to reflect the parallel beams of light produced by the lenses 26 and 27 onto the center of the lenses 15 and 16, and thereby to set up interference between light reflected from the surfaces of the diaphragms 7 and 12 and the convex surfaces of the lenses 15 and 16 respectively causing a fringe pattern of concentric bright and dark rings to be produced, which are known as Newton's Rings.

The chambers 5 and 11 in which the interference patterns are set up are hermetically sealed and therefore protected from any dirt or contamination that might otherwise reduce the visibility of the patterns or damage the reflective surfaces of the diaphragms and lenses.

Two further mirrors 30 and 31 are mounted in the transducer housing 19, being located above the semi-reflecting mirror 28 and below the semi-reflecting mirror 29 respectively so as to view the pressure capsule 2 through the semi-reflecting mirrors. The mirrors 30 and 31 reflect magnified images of any interference patterns produced in the upper and lower cells 3 and 4 respectively through further sealed windows 32 and 33 in the housing 19 that are located adjacent the windows 24 and 25. Two arrays 34 and 35 of the ends of the fibre-optic cables 22 and 23 are secured to the transducer housing 19 outside the windows 32 and 33 respectively and are situated in the focal planes of converging lenses 36 and 37 that are positioned between the mirrors 28 and 30, and 29 and 31 respectively.

Figure 3:
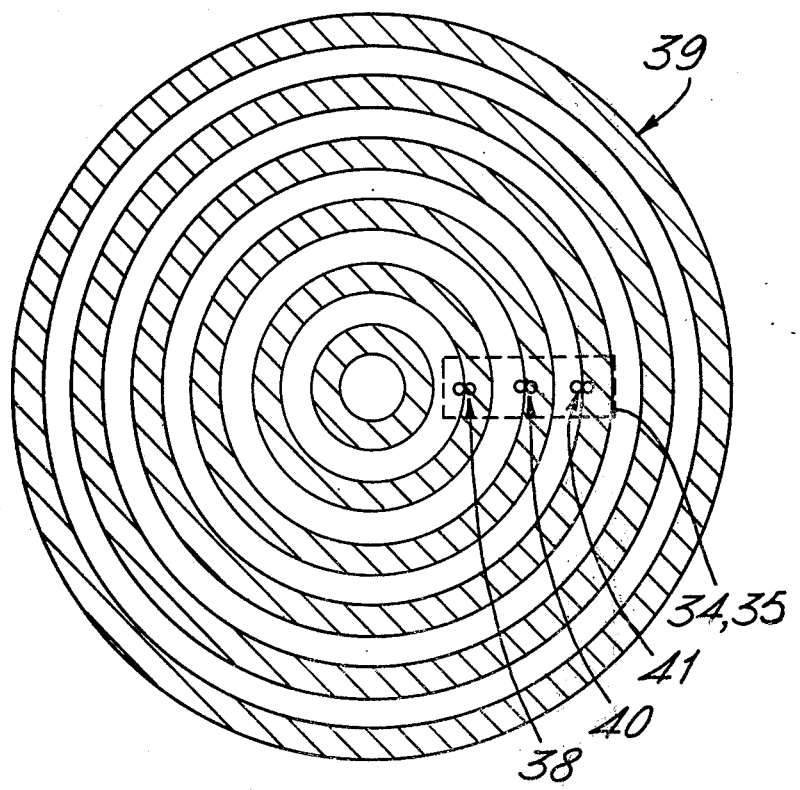
FIG. 3 is an enlarged view of an interference pattern produced in the apparatus of FIG. 1.

With reference to FIG. 3, the arrays 34 and 35 each include a pair of fibre ends 38 separated from one another along a horizontal radius of the Newton's Rings pattern 39 that is imaged on the array. The spacing between the ends 38 is equal to one quarter of the spacing between adjacent rings of the pattern 39. The arrays 34 and 35 include a further two such pairs of fibre ends 40 and 41 which may be used if the first pair 38 fails to operate correctly.

Referring now again to FIGS. 1 and 3, the output from each fibre end of the pair 38 of the upper array 34 is supplied to individual photo-cells 42 and 43. Similarly the output from each fibre end of the pair 38 of the lower array 35 is supplied to individual photo-cells 44 and 45. The output from each of the photo-cells 42 to 45 is supplied to a counter 46 (the operation of which will be described later), the output of the counter being supplied to a display device 47.

In operation, any increase in fluid pressure as supplied to the chamber 6, will cause a deflection of the diaphragm 7 into the chamber 5, and any decrease in pressure will cause a deflection of the diaphragm 7 out of the chamber 5. Any change in the separation of the diaphragm 7 from the lens 15 will cause a shift of the inteference fringe pattern set up, for example, as the diaphragm 7 is deflected towards the lens 15 the Newton's Rings will move outwards, that is, they will increase in diameter. Change in pressure in the chamber 6 therefore causes displacement of the Newton's Rings pattern imaged on the fibre-optic array 34 and a consequent change in the output of photo-cells 42 and 43 (typically a change in pressure of one pound per square inch causes a movement of ten fringes). The number of fringes moved over the fibre ends 38 is counted by the counter 46 and the phase difference between the outputs of the photo-cells 42 and 43 enables the direction of movement of the fringes to be determined.

Any change in temperature of the pressure transducer 1 will cause a change in pressure within the upper chamber 10 of the lower cell 4 and therefore a fringe shift of the Newton's Rings pattern imaged on the array 35. The output pulses derived from the photo-cells 44 and 45 produced upon change in temperature are subtracted by the counter 46 from the pulses derived from the photo-cells 42 and 43 thereby to compensate for temperature changes in the upper cell 3.

It has been found, with the first form of pressure transducer, that when subjected to high levels of vibration or large temperature changes, relative diaplacement may occur between the mirrors 28 to 31 and the capsule 2 owing to flexing of the components of the transducer 1 and thermal expansion of the housing 19. Such displacement may alter the position of the pattern of fringes 39 imaged on the fibre-optic arrays 34 and 35 and thus make it more difficult to obtain an accurate measurement of the displacement of the fringes upon change in pressure. The second form of pressure transducer, as shown in FIG. 4, may be used in the apparatus in the same way and alleviates these difficulties by reducing the relative displacement between the pressure capsule and the fibre-optic arrays.

Figure 4:
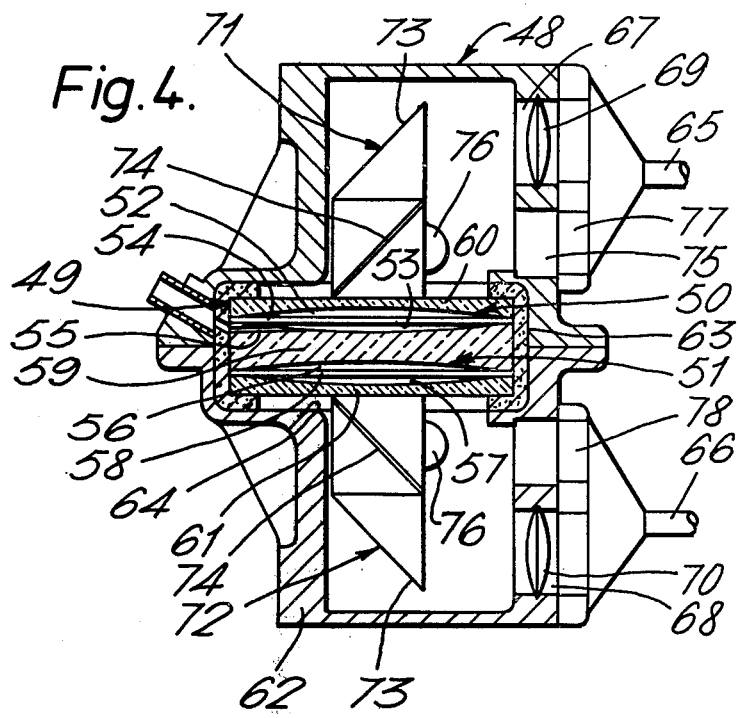
FIG. 4 is a part-sectional view of a second form of pressure transducer that may be used in the pressure-responsive apparatus shown in FIG. 1.
Figure 5:
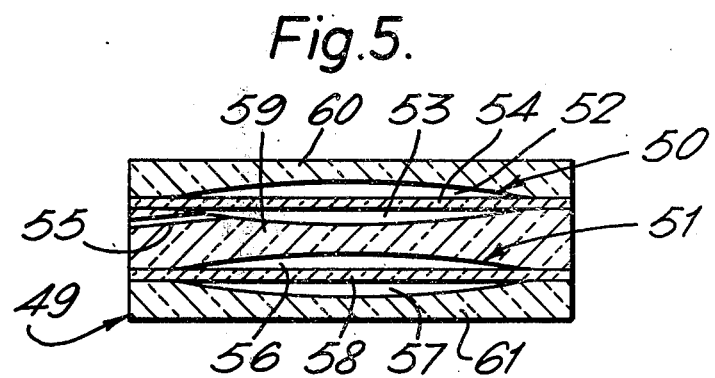
FIG. 5 is an enlarged sectional view of a pressure capsule used in the second form of pressure transducer shown in FIG. 4.

With reference to FIGS. 4 and 5, the second form of pressure transducer 48 has a pressure capsule 49 that includes concave lenses, although a pressure capsule identical to that used in the first form of transducer, having convex lenses, could alternatively be used. The capsule 49 has an upper cell 50 and a lower cell 51, the upper cell being divided into upper and lower chambers 52 and 53 respectively by a flat diaphragm 54. The lower chamber 53 communicates through a passageway 55 in the wall of the assembly 49 to a pressure inlet, whereas the upper chamber 52 is sealed from the lower chamber and is evacuated to a low pressure. Similarly, the lower cell 51 is divided into upper and lower chambers 56 and 57 respectively by a flat diaphragm 58, the lower chamber 57 being evacuated to a low pressure whereas the upper chamber is at a different pressure, such as, for example, atmospheric pressure.

The capsule 49 has a circular plate 59 which separates the two cells 50 and 51 and which has a shallow concave recess centrally in each of its upper and lower faces. The diaphragms 54 and 58 are located above and below the plate 59 respectively with their edges resting on and sealed to the edges of the upper and lower surfaces of the plate, thereby enclosing the recesses in the plate and forming the lower chamber 53 of the upper cell 50 as well as the upper chamber 56 of the lower cell 51.

Two plano-concave lenses 60 and 61, each of which has a circumferential rim about its concave surface, are located above and below respectively the two diaphragms 54 and 58, with their rims sealed about the edges of their respective diaphragms such that the concave surface of each lens faces its respective diaphragm and thereby forms a small enclosure constituting the upper chamber 52 of the upper cell 50 and the lower chamber 57 of the lower cell 51. The capsule 49 is therefore of a symmetrical construction and, apart from the passageway 55 communicating with the chamber 53, is hermetically sealed. The entire capsule 49 is made of the same material as the capsule 2 used in the first form of pressure transducer, namely a glass-ceramic material, a semi-reflective coating being formed on the curved surface of each lens 60 and 61, and a reflective coating being formed on the side of each diaphragm 54 and 58 facing its respective lens.

The second form of transducer has a housing 62 similar to the housing 19 in the first form of transducer 1, the capsule 49 being similarly supported by an anti-vibration mounting 63 within a central recess 64 of the housing. In this form of transducer, however, illumination is directed towards the surfaces of the capsule 49 via prism assemblies mounted on the capsule, in place of the mirrors mounted on the housing 19 in the first form of transducer 1. Mirrors mounted directly on the capsule 49 could alternatively be used in the second form of transducer. Radiation from the remote light source (not shown) is supplied by fibre-optic cables 65 and 66 to windows 67 and 68 in the side of the housing 62 and positioned respectively above and below the capsule 49.

Light emerging from the ends of the cables 65 and 66 passes through identical converging lenses 69 and 70 respectively which are mounted in the windows 67 and 68. The lenses 69 and 70 are spaced from the ends of the cables 65 and 66 by a distance equal to their focal lengths, so as to produce parallel beams of light that are directed parallel to the surfaces of the capsule 49. The light beams fall on upper and lower prism assemblies 71 and 72 which are mounted with their bases central on the upper and lower surfaces respectively of the pressure capsule.

The prism assemblies 71 and 72 are identical and are formed of three right-angled prisms joined together such as to form first and second semi-reflecting parallel surfaces 73 and 74 inclined at forty five degrees to the base of the assembly. The first surface 73 of each prism assembly is located remote from the base, and acts to reflect the parallel beams of light produced by the converging lenses 69 and 70 through the second semi-reflecting surface 74 onto the center of the lenses 60 and 61. Interference is thereby set up between light reflected from the surfaces of the diaphragms 54 and 58 and the concave surfaces of the lenses 60 and 61 respectively causing Newton's Rings fringe patterns to be produced.

The second surface 74 of the upper prism assembly 71 is located adjacent the base and reflects an image of any interference pattern produced in the upper cell 50 parallel to the surface of the capsule 49 and through a further window 75 in the housing 62, located adjacent the window 67. The upper prism assembly 71 carries a converging lens 76 which acts to focus a magnified image of the interference pattern onto an array 77 of ends of the fibre-optic cable 65 secured to the transducer housing 62 outside the window 75.

Similarly, the second surface 74 of the lower prism assembly 72 reflects a magnified image of any interference pattern produced in the lower cell 51 onto an array 78 of the ends of the fibre-optic cable 66.

By mounting the prism assemblies 71 and 72 directly on the pressure capsule 49 relative displacement between the prism assemblies and the pressure capsule caused by, for example, temperature changes and vibration, is eliminated. In order further to reduce any relative displacement caused by vibration, between the fibre-optic arrays 77 and 78, and the interference patterns imaged on them, the arrays may be mounted directly on the pressure capsule 49, and the fibre-optic cables 65 and 66 may extend into the housing 62 through a metal-glass seal.

Displacement of the Newton's Rings patterns imaged on the arrays 77 and 78 is sensed in the same manner as described earlier except that, since the capsule 49 uses concave lenses, the fringe shift upon change in pressure will be in the opposite sense. As the diaphragm 54 is deflected towards the lens 60, upon increase in pressure in the chamber 53, the Newton's Rings will move inwards, that is, they will decrease in diameter.

In both the first and second forms of transducer the effect of small vertical displacement of the fringe pattern relative to the fibre-optic arrays, such as might be caused, for example, by vibration of the capsule assembly, is minimalized by arranging the fibre ends along a horizontal radius of the fringe pattern. The effect of vertical displacement of the fringe patterns may be further reduced by mounting several fibre-optic arrays above one another. Two arrays, for example, could be located equally above and below the horizontal radius of the fringe pattern, so that any difference between the outputs of the two arrays due to vertical displacement of the fringe pattern, could be sensed and an appropriate correction made. Similarly, relative displacement between the fibre-optic arrays and the fringe pattern in a horizontal plane at right angles to the plane in which the sectional view of FIG. 1 is taken, could be compensated for by sensing the difference between the outputs of these arrays and an additional array arranged along the horizontal radius to the other side of the center of the pattern. The accuracy in measuring displacement of the fringe pattern may be increased by using a greater number of fibre ends and associated photocells so that the position of each fringe can be determined with greater accuracy.

When the pressure-responsive apparatus described is used for measuring the pressure of a gas-turbine engine in an aircraft, it is only generally required to measure the pressure of the engine above atmospheric pressure. If the counter 46 is switched on before the engine is started, that is, when it is at atmospheric pressure, the counter will measure the change in pressure from this initial value and hence at any instant will provide a measure of the engine pressure above that of the atmosphere.

By using diaphragms having a different thickness, the response of transducers to pressure changes can be altered and hence different transducers can be formed for measuring in different pressure ranges. Several different transducers could be used in conjunction for measurements over an extended pressure range, readings from one transducer being displayed up to a certain pressure and readings from another transducer being displayed above this pressure.

The upper chamber of the lower cell in the pressure capsule could be formed with a passsageway (not shown) which would communicate with the pressure inlet but which would normally be blocked. If the upper cell failed to operate correctly, the lower cell could then be connected to the pressure inlet and used to determine the pressure at the inlet instead of functioning merely as a reference cell. In this mode of operation the counter 46 would be modified, prior to connecting the lower cell to the pressure inlet, to respond only to the output from the photo-cells 44 and 45. The counter 46 would therefore provide an output to the display 47 in accordance with the pressure within the lower cell, the output not being corrected for any temperature changes.

The pressure transducers 1 and 48 can be readily adapted for measuring the ratio of two pressures. For example, the pressure in the jet pipe of a gas-turbine engine could be supplied to the upper cell, and the pressure in the compressor inlet of the gas-turbine engine could be supplied to the lower cell, through a separate passageway. The counter 46 could then be adapted to provide an output in accordance with the ratio of the pressures in the jet pipe and the compressor inlet of the engine.

I claim:

1. Pressure-responsive apparatus comprising: a capsule, said capsule having a symmetrical construction and being made of a glass-ceramics material having a substantially constant modulus of elasticity over a wide temperature range, said capsule comprising first and second cells, each said cell defining a first and second chamber, each said first chamber having a lens with a curved reflective surface, and including a diaphragm and means mounting said diaphragm to divide said first and second chambers from one another, said capsule having a passageway, said passageway communicating with the said second chamber of said first cell for supply of pressure thereto; a light source, said light source providing illumination of the said first chambers of said first and second cells such as to produce first and second patterns of fringes respectively caused by interference between light reflected by the said curved reflective surface of each lens and each diaphragm; sensing means for sensing displacement of the said first and second patterns of fringes and the direction of such displacement so as thereby to derive a first output in accordance with deflection of each said diaphragm; first and second fibre-optic means; means mounting said fibre-optic means to extend between said light source and said capsule, and between said capsule and said sensing means such that light from said light source is transmitted to said capsule, and light from said first and second patterns of fringes is transmitted to said sensing means; and electric circuit means for deriving a second output in accordance with the difference between said two first outputs, said second output being dependent on change in pressure supplied to the said second chamber of said first cell.

2. Pressure-responsive apparatus comprising: a capsule, said capsule having a symmetrical construction and being made of a glass-ceramics material having a substantially constant modulus of elasticity over a wide temperature range, said capsule comprising first and second cells, each said cell defining a first and second chamber, each said first chamber having a lens with a curved reflective surface, and including a diaphragm and means mounting said diaphragm to divide said first and second chambers from one another, said capsule having a passageway, said passageway communicating with the said second chamber of said first cell for supply of pressure thereto; a light source, said light source providing illumination of the said first chambers of said first and second cells such as to produce first and second patterns of fringes respectively caused by interference between light reflected by the said curved reflective surface of each lens and each diaphragm; sensing means for sensing displacement of the said fringes and the direction of such displacement so as thereby to derive a first output in accordance with deflection of each said diaphragm; first and second fibre-optic means; means mounting said fibre-optic means to extend between said light source and said capsule, and between said capsule and said sensing means such that light from said light source is transmitted to said capsule, and light from said first and second patterns of fringes is transmitted to said sensing means; first and second prism assemblies; means mounting said first and second prism assemblies on said capsule to direct illumination from said first and second fibre-optic means respectively to said first chamber of said first and second cells respectively, said first and second prism assemblies also directing said first and second patterns of fringes respectively to said first and second fibre-optic means respectively; and electric circuit means for deriving a second output in accordance with the difference between said two first outputs, said second output being dependent on change in pressure supplied to the said second chamber of said first cell.

3. A temperature compensated pressure-responsive apparatus including a capsule divided into first and second cells each of which defines a first and second chamber, each of said first chambers having a curved reflective surface, each said cell including a diaphragm having a reflective surface and means mounting said diaphragm to divide the said first and second chambers of said cell from one another, said capsule having a passageway communicating with one chamber of said first cell for supply thereto of a pressure to be sensed, and said second cell being sealed whereby its interior pressure is a function of ambient temperature, a light source for providing illumination of the said first chamber of both the said first and second cells to produce first and second patterns of fringes respectively caused by interference between light reflected by each said curved reflective surface and the reflective surface of each said respective diaphragm; sensing means for sensing displacement of the said first and second patterns of fringes; and means for providing an indication of the change in pressure of said first cell with respect to said second cell in accordance with the difference between the displacement of said first and second patterns of fringes, thereby to provide an indication of the pressure being sensed, compensated for changes in temperature of the capsule.

4. The apparatus of claim 3 wherein said capsule is of a symmetrical construction.

5. The apparatus of claim 3 wherein said first and second diaphragms are of a glass-ceramics material.

6. The apparatus of claim 5 wherein said first and second diaphragms are of lithium alumino silicate.

7. The apparatus of claim 3 wherein said capsule is of a glass-ceramics material.

8. The apparatus of claim 7 wherein said capsule is of lithium alumino silicate.

9. The apparatus of claim 3 including fibre-optic means for transmitting illumination from said light source to both said first and second cells.

10. The apparatus of claim 3 including fibre-optic means for transmitting light from said first and second patterns of fringes to said sensing means.

11. The apparatus of claim 3 including first and second optical assemblies, and means mounting said first and second optical assemblies on said capsule to direct illumination onto said first and second cells respectively, said first and second optical assemblies also directing light from said first and second patterns of fringes respectively.

12. The apparatus of claim 11 wherein said first and second optical assemblies are each formed from three prisms assembled together to form two reflective surfaces located above one another such that one of said reflective prism surfaces acts to reflect illumination from said light source onto said capsule and the other of said reflective prism surfaces acts to reflect light from said patterns of fringes.

* * * * *